United States Patent
Yoo

(10) Patent No.: US 6,674,977 B2
(45) Date of Patent: Jan. 6, 2004

(54) METHOD OF AND APPARATUS FOR DETECTING ERROR IN LASER SCANNING DEVICE BY DETERMINING WHETHER A LIGHT SOURCE REQUIRES EXCHANGE OR A CONTAMINANT IS PRESENT IN AN OPTICAL PATH

(75) Inventor: Young-ho Yoo, Yongin (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/219,296

(22) Filed: Aug. 16, 2002

(65) Prior Publication Data

US 2003/0091354 A1 May 15, 2003

(30) Foreign Application Priority Data

Nov. 12, 2001 (KR) ........................................ 2001-70013

(51) Int. Cl.[7] .............................................. G03G 15/00
(52) U.S. Cl. ........................................ 399/32; 358/406
(58) Field of Search .......................... 399/32; 358/406, 358/475; 250/215; 355/30, 68

(56) References Cited

U.S. PATENT DOCUMENTS 5,978,614 A 11/1999 Takeuchi
6,292,269 B1 * 9/2001 Kawai ......................... 358/406

FOREIGN PATENT DOCUMENTS

JP 5-14616 A * 1/1993

* cited by examiner

Primary Examiner—Joan Pendegrass
(74) Attorney, Agent, or Firm—Staas & Halsey LLP

(57) ABSTRACT

A method and an apparatus for detecting an error in an image scanning device that obtains image data upon scanning a document by using a light of beam radiated from a lamp, including a setting operation of obtaining initial reference values of a light quantity of the lamp and storing the obtained initial reference values in a memory, a storing operation of measuring the light quantity of the lamp during use of an image scanning system, obtaining measured values for comparing with the initial reference values, and storing the measured values in the memory, and a comparing/determining operation of determining whether to check the error to represent the lamp or a contaminant in an optical path by comparing the initial reference values with the measured values.

53 Claims, 8 Drawing Sheets

METHOD OF AND APPARATUS FOR
DETECTING ERROR IN LASER SCANNING
DEVICE BY DETERMINING WHETHER A
LIGHT SOURCE REQUIRES EXCHANGE OR
A CONTAMINANT IS PRESENT IN AN
OPTICAL PATH

CROSS-REFERENCE TO RELATED
APPLICATIONS

This application claims the benefit of Korean Patent Application No. 2001-70013, filed Nov. 12, 2001, in the Korean Industrial Property Office, the disclosure of which is incorporated herein by reference.

BACKGROUND OF THE INVENTION

1. Field of the Invention

The present invention relates to an image scanning device, and more particularly, to a method and an apparatus for detecting an error in an image scanning device, determining either the exchange of a light source or the presence of a contaminant in an optical path and then informing of the result of the determination.

2. Description of the Related Art

Generally, an image scanning apparatus is incorporated in a copier, a facsimile machine and a copier-facsimile system. One example of the image scanning apparatus is shown in FIG. 1.

FIG. 1 shows an image scanning apparatus disclosed in U.S. Pat. No. 5,978,614, to Takeuchi, issued Nov. 2, 1999, and FIG. 2 is a flowchart showing a method of measuring a quantity of light of a lamp by using the image scanning apparatus of FIG. 1 and informing of a time for lamp replacement.

Referring to FIG. 1, the image scanning apparatus includes a scanning table unit 11 provided to scan a sheet of document placed on a scanning plate 10, and a document feeding unit 12 automatically feeding a plurality of sheets of documents for an automatic and sequential scanning of the documents. First and second scanning units 13 and 14 are driven within the stand-by position P1, white panel position P2, and first and second scanning start positions P3 and P4. The first and second scanning units 13 and 14 are changed to a standby mode when moving to the standby position P1 by a certain translating means, scan the white panel 15 in the white panel position P2, and scan the document in the first and second scanning positions P3 and P4.

Referring to FIG. 2, in a so-called Flat Bed Scanner (FBS) that performs a scanning operation by using the scanning table unit 11, a controller determines whether a start key is selected from a user's manipulation of keys in operation S10. If the start key is determined as being selected, the first scanning unit 13 moves to the second scanning position P4 in operation S11. Next, the first scanning unit 13 scans the document while moving to a job completion position P5, and at the same time, the image data obtained upon scanning the document is stored in a storage means in operation S12. Then the first scanning unit 13 moves to the white panel position P2 in operation S13. The white panel 15 is scanned and detected by a charge coupled device (CCD) sensor 17 in operation S14.

The controller determines whether or not white pixels of the image data of the scanned document are less than 90% of a predetermined reference in operation S15. When the white pixels of the image data are greater than 90% of the reference, the controller determines a light source 16 emits light appropriately, and compensates the data stored in S12 and prints an image on the sheets in operation S16. Then the first scanning unit 13 moves to the standby position P1 in operation S17.

When the white pixels of the image data are less than 90% of the reference, the controller determines whether the light source 16 emits the light inappropriately. And in this case, the controller deletes the image data stored in the storage means in operation (step S18). Then the controller indicates through a certain display device a need for a lamp replacement in operation (step S19). Accordingly, the user notices the message in the display and replaces the lamp with a new one so as to maintain the appropriate scanning.

A so-called Automatic Document Feeder (ADF) performs the scanning operation by using the document feeding unit 12, in a similar manner as the scanning operation of the FBS. The only difference between the FBS and the ADF is that the ADF first scans the white panel 15, scans the document, and then compares/determines the white pixels of the image data. This is generally because the white panel 15 is placed between the document scanning positions of the FBS and the ADF.

According to the conventional image scanning apparatus as described above, the controller determines that the light quantity of the lamp is inappropriate if the white pixels of the image data of the scanned white panel are less than 90% of the reference. However, the white pixels are sometimes determined as being less than 90% of the reference when there are contaminants disposed in the optical path having a white panel, a mirror, etc.

If the message for the replacement of the lamp is due to the contaminants contained in the optical path, it would be disadvantageous for the user to buy a new lamp that is not actually required. Also, if there is not a sufficient quantity of light due to the presence of the contaminants, the light quantity will still be insufficient even if the user replaces the lamp with a new one.

Also, even when the light quantity of the lamp drops, if taking into account of the fact that the amplifier could compensate the lamp, the detection of error of the scanning apparatus can hardly be accurate only by comparing and determining the light quantity of the lamp.

SUMMARY OF THE INVENTION

The present invention has been made to overcome the problems of the related art, and accordingly, it is an object of the present invention to provide a method of detecting an error in an image scanning device, which is improved so as to distinguish a need for a lamp replacement from a contamination of an optical path, and inform the result of the detection accordingly.

Additional objects and advantageous of the invention will be set forth in part in the description which follows and, in part, will be obvious from the description, or may be learned by practice of the invention.

The above and other objects are accomplished by a method of detecting an error in an image scanning device that obtains image data when a document is scanned by using a light beam radiated from a lamp according to the present invention. The method includes a setting operation of obtaining initial reference values of a light quantity of the lamp and storing the obtained initial reference values in a memory, a storing operation of measuring the light quantity of the lamp during use of an image scanning system, obtaining measured values for comparing with the initial reference values, and storing the measured values in the memory, and a comparing/determining operation of determining whether to check a presence of error in the lamp or to check a presence of contaminant in an optical path by comparing the initial reference values with the measured values.

The setting operation includes scanning a white panel, extracting a light quantity from the scanned white panel, calculating a reference value R and an initial average value A from the extracted light quantity of the white panel, storing the calculated reference value R and the initial average value A in the memory, dividing the white panel into a number of pixel divisions n, and calculating initial divisional values B1~Bn of light quantities of the respective pixel divisions and storing the calculated initial divisional values B1~Bn in the memory.

The storing operation includes extracting a light quantity of a white value by scanning a white panel, obtaining measured average value a and a minimum value m of the light quantity from the extracted light quantity of the white value, storing the obtained average value a and the minimum value m in the memory, dividing the white value into divided values of pixel divisions n, and calculating measured divisional values b1~bn of the light quantity of the respective n pixel divisions n and storing the calculated measured divisional values b1~bn in the memory.

A first checking operation is further provided in the comparing/determining operation, for checking a presence of abnormality of the lamp when a difference between the initial reference values and the measured values is more than a predetermined reference.

The first checking operation includes searching the pixel divisions n for a pixel division to which the minimum value m falls; determining whether the pixel division having the minimum value m is a first division or a nth division, such as a last division, the first and nth divisions disposed at opposite outside portions of the white panel, comparing and thus determining whether the minimum value m is smaller than the calculated reference value R, when the pixel division having the minimum value m is the first or the nth division, and displaying an urging message for a lamp replacement when the minimum value m is smaller than the reference value R.

A second checking operation is also provided either when the pixel division having the minimum value m is not the first nor the nth division, or when the minimum value m is smaller than the reference value R, wherein the second checking operation includes checking the presence of contaminants in the optical path.

The second checking operation is also provided after the display of the urging message for the lamp replacement, and includes checking the presence of contaminants in the optical path.

The second checking operation includes comparing the initial divisional average values B1~Bn of the light quantity of the respective pixel divisions n with the measured divisional average values b1~bn of the light quantity of the respective pixel divisions, respectively, determining whether there is a pixel division where a difference between the initial average values B1~Bn and the measured divisional values b1~bn is greater than a predetermined reference, and displaying a message indicating a contamination of the optical path when there is the pixel division having the difference of the initial divisional values B1~Bn, b1~bn greater than the predetermined reference.

BRIEF DESCRIPTION OF THE DRAWINGS

These and other objects and advantages of the present invention will be more apparent and more readily appreciated from the following description of the preferred embodiment of the present invention, taken in conjunction with the accompanying drawings, of which.

DETAILED DESCRIPTION OF THE PREFERRED EMBODIMENTS

Figure 1:
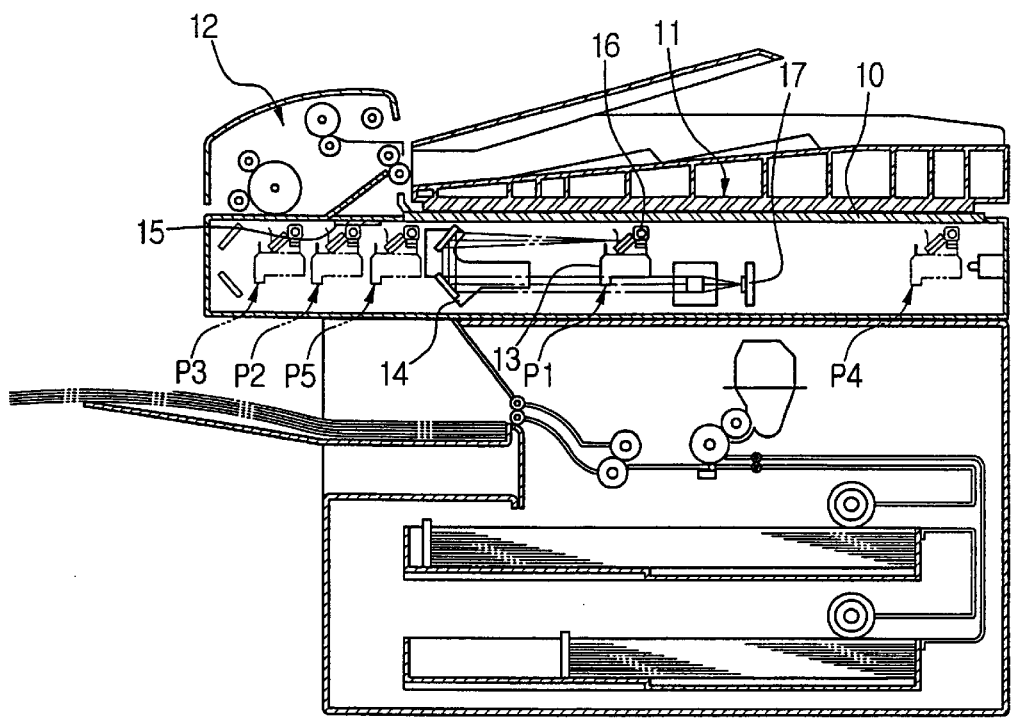
FIG. 1 is a schematic sectional view showing a conventional image scanning apparatus.
Figure 2:
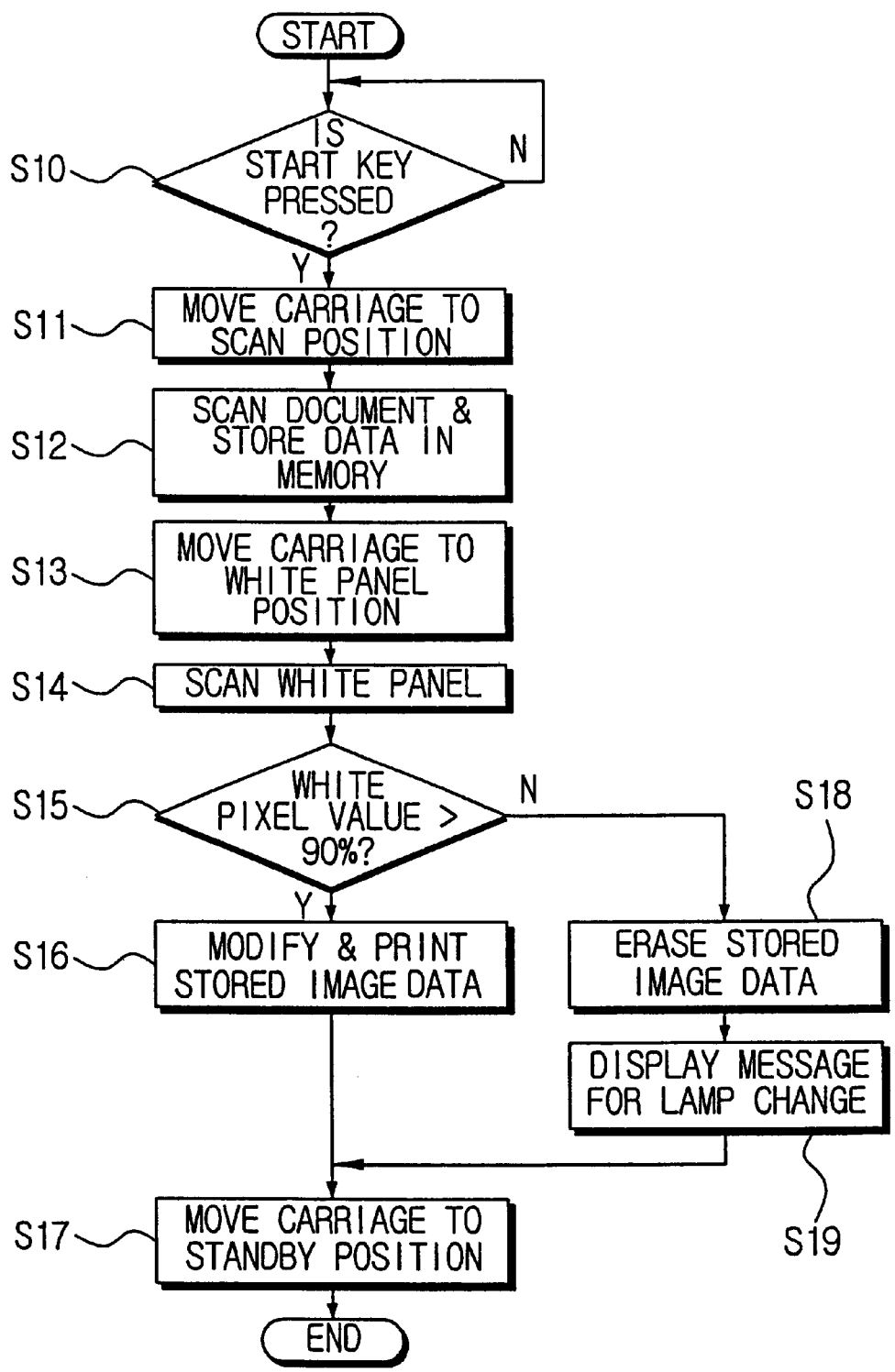
FIG. 2 is a flowchart for explaining a method of checking the conventional image scanning apparatus for a time for lamp replacement.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

From now on, the present invention will be described in greater detail by referring to the appended drawings.

Figure 3:
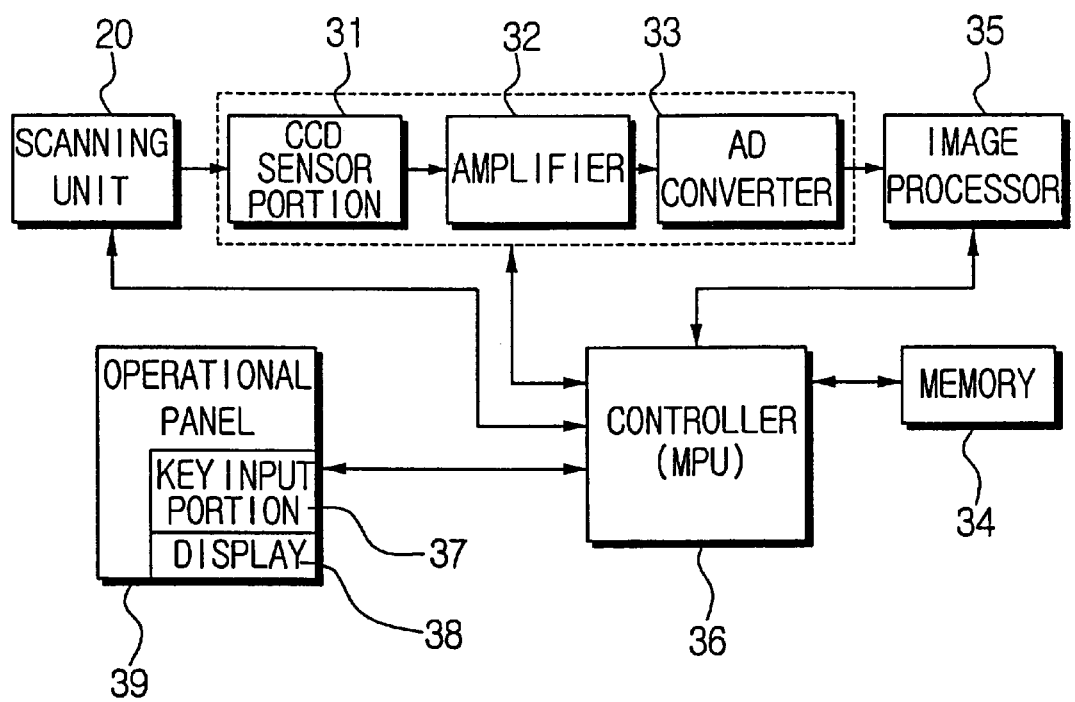
FIG. 3 is a block diagram of an image scanning apparatus according to an embodiment of the present invention.

FIG. 3 is a block diagram showing an image scanning device according to an embodiment of the present invention. The scanning device includes a charge coupled device (CCD) sensor 31 that receives a signal generated from a document scanned by using a scanning unit 20, an amplifier that amplifies the received signal of the CCD sensor 31 by a predetermined amount, an A/D converter 33 that converts the amplified analogue signal into a digital signal, a controller 36 that stores the digitalized image in a storage unit 34 and controls so that the data can be edited or outputted by an image processor 35 and an operation panel 39 having a key input portion 37 operable by a user and a display 38.

Figure 4:
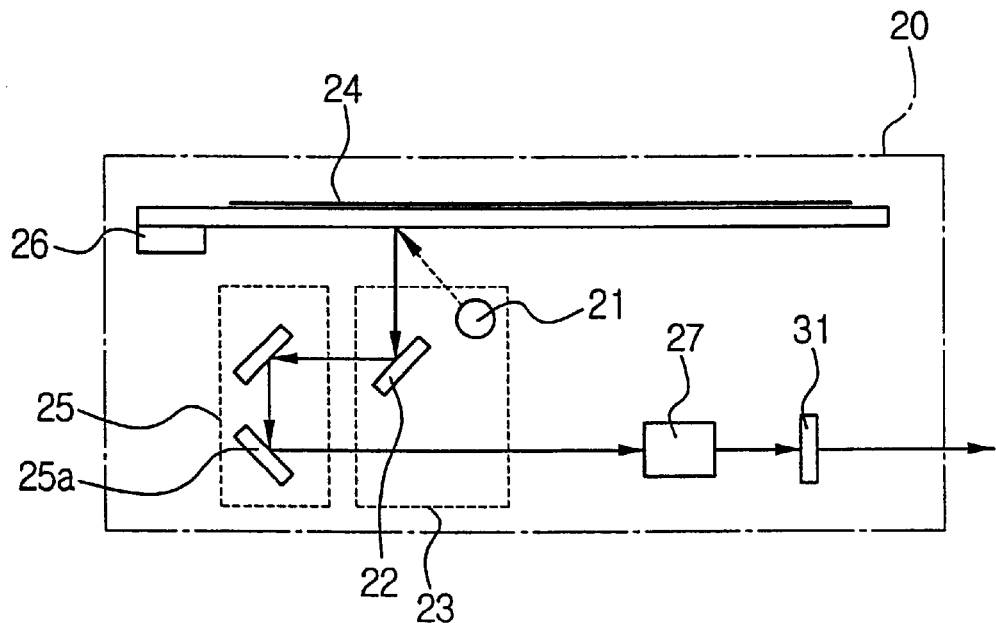
FIG. 4 is a view showing a scanning unit of the image scanning apparatus of FIG. 3.

The controller 36 controls a general document reading operation by controlling the driving of the scanning unit 20 according to a control program. The controller 36 controls so as to move a first carriage 23 having a lamp 21 and a mirror 22 and a second carriage 25 having mirrors 25a, which are shown in FIG. 4. The controller 36 also controls the driving of the lamp 21 so as to scan a document 24.

The storage unit 34 includes a RAM or EEROM, and stores various data generated during the execution of the program, and various reference data.

The key input portion 37 has numeral keys and function keys for operation of the respective components, and generates and sends to the controller 36 the data required for controlling the image scanning device.

The display 38 is an indicating device such as a Liquid Crystal Display (LCD), and displays a certain message while being driven by the controller 36.

In FIG. 4, a reference numeral 26 denotes a white panel, and a reference numeral 27 denotes a condensing lens. The scanning unit 20 shown in FIG. 4 is a typical example of a so-called optical path moving type of a reduced optical system that scans the image while the first and second carriages 23 and 25 move along the optical path.

During driving of the image scanning device constructed as above, a method distinguishes the need for a lamp replacement from the existence of contaminants in the optical path and selectively indicates either the need for the lamp replacement or the existence of the contaminants in the optical path.

Figure 5:
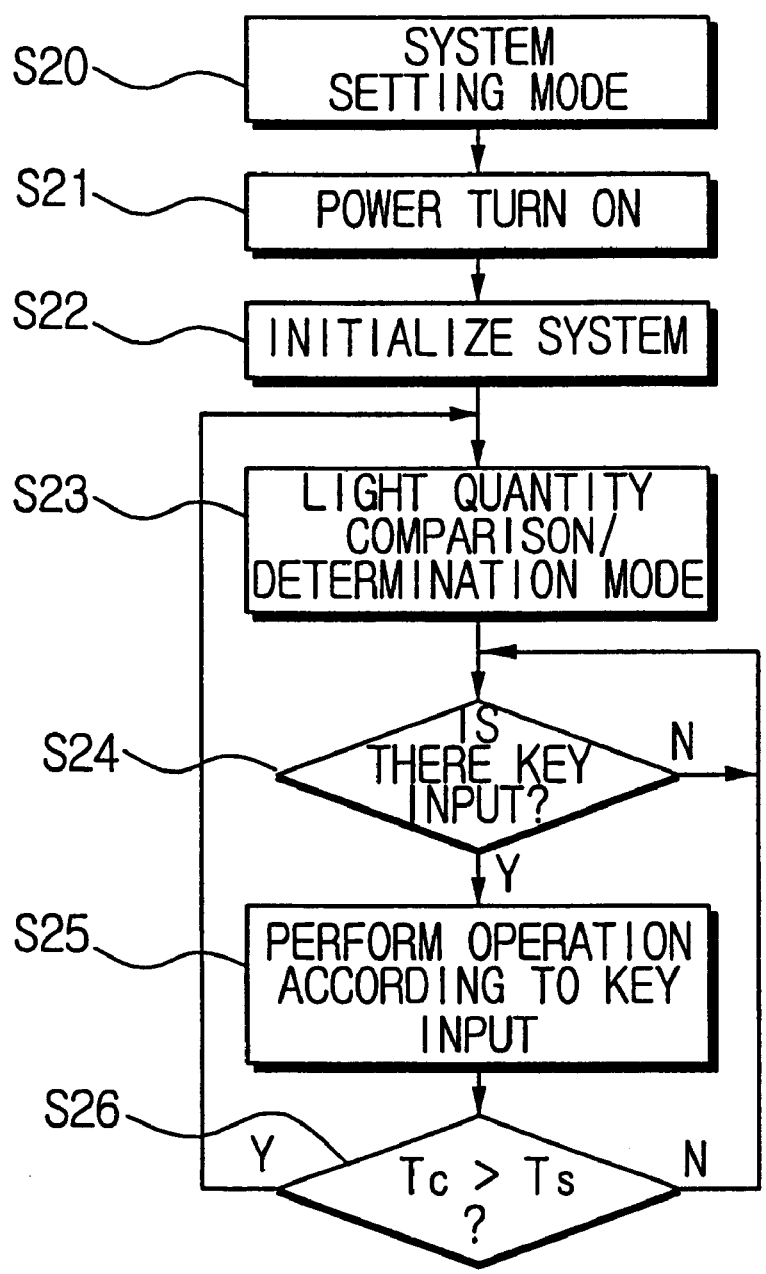
FIG. 5 is a flowchart explaining a method of detecting an error in an image scanning device according to an embodiment of the present invention.

Referring to FIG. 5, first, the entire system of the image scanning device is set in operation S20. The operation S20 is performed through a key manipulation at the time of shipping the product, or in a serviceman mode, i.e., when some parts are replaced or repaired. In this embodiment, initial references for the lamp 21 are obtained and stored in the storage unit 34. The operation S20 will be described in detail in a later part of the description and FIG. 6.

With the system being set as described above, the user turns the power on to use the device in operation S21. Accordingly, by a control program, the data are initialized, and the image scanning device is ready for the scanning operation in operation S22).

Next, the quantity of light of the lamp 21 is measured, and the comparison/determination operation is selectively performed as to whether the lamp 21 operates appropriately or there are contaminants in the optical path including the white panel 26 in operation S23.

Figure 8:
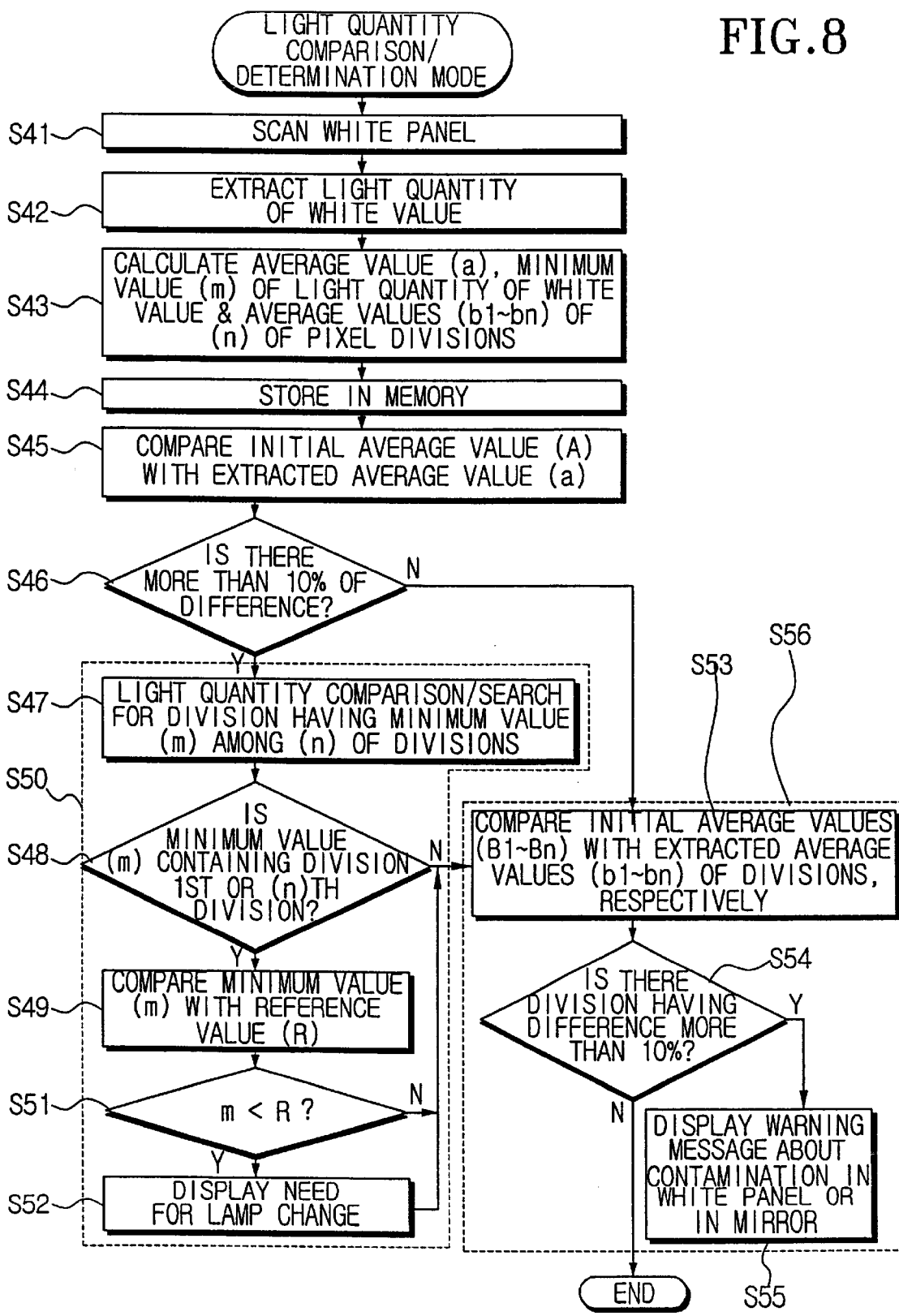
FIG. 8 is a flowchart explaining a comparing/determining operation of FIG. 5.

In the operation S23, appropriate measures are taken according to the result of the comparison/determination operation to perform a normal scanning operation of the image scanning device. That is, the component can be replaced, repaired, or the device can be cleaned to remove the contaminants disposed in the optical path. The detailed description about the operation S23 will be made in a later part of the description and FIG. 8.

After the operation S23, the controller 36 determines whether an operation start command has been input through the key input or the like in operation S24, and performs the corresponding operation according to the key input in operation S25 That is, the controller 36 either performs the scanning by driving the scanning unit 20, or performs operations like print, copy, etc., by driving the image processor 35.

After the operation S25, the system is in a standby mode. The controller 36 compares/determines whether a counting time Tc counted from the operation S23 till the standby mode exceeds a predetermined reference time Ts, i.e., 24 hours for example in operation S26. When it is determined that the counting time Tc exceeds the reference time Ts, the operation S23 repeats, and if not, the device is in the standby mode until the key input.

Figure 6:
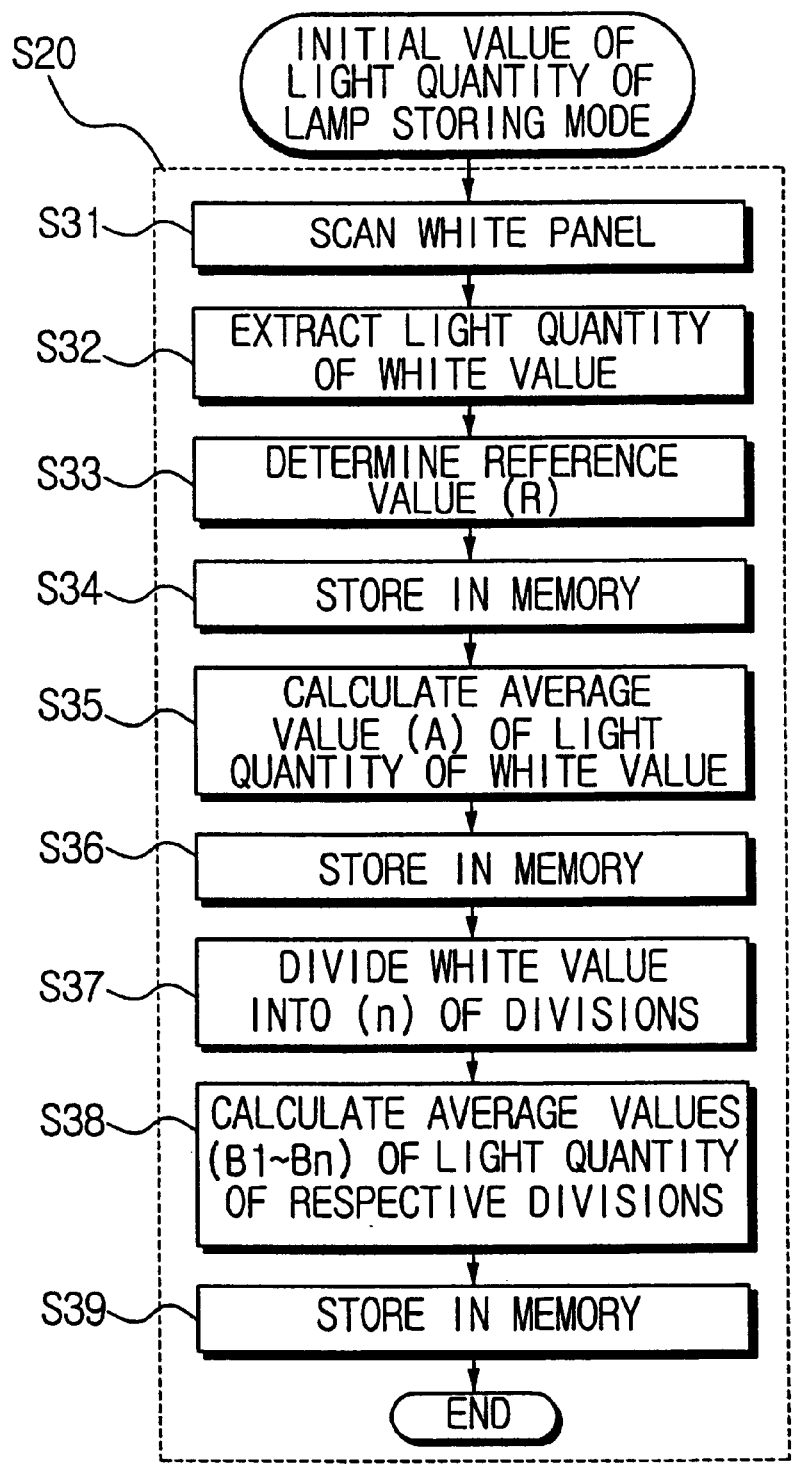
FIG. 6 is a flowchart explaining a system setting mode of FIG. 5.

The system setting mode in the operation S20 will be described in greater detail below with reference to FIG. 6.

Figure 7:
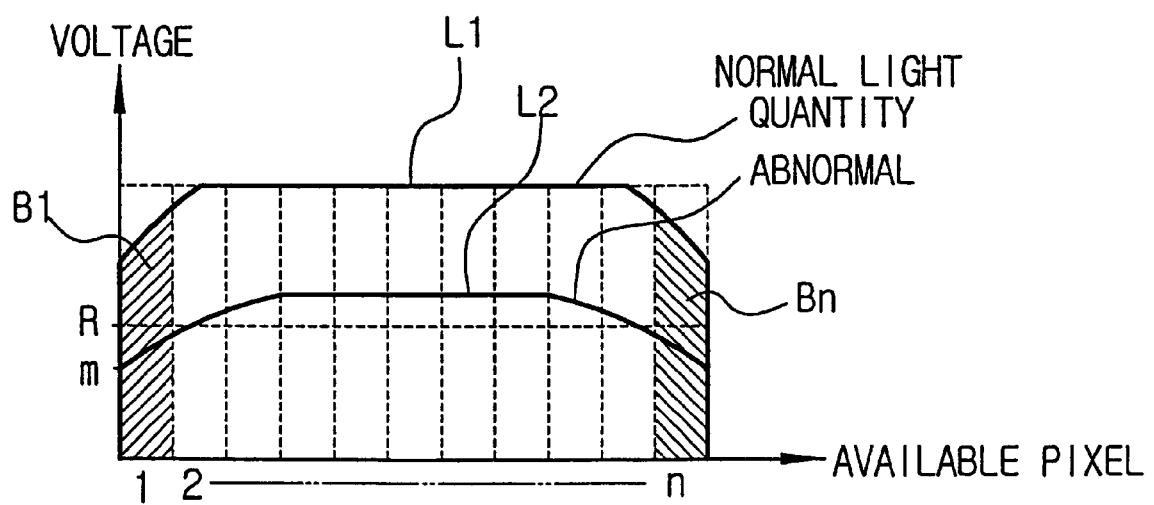
FIG. 7 is a graph showing the quantity of light measured when there is a need for lamp replacement.

The setting mode in the operation S20 is performed at the time of the shipping, or at the end of the component replacement or repair. Referring to FIG. 6, in the setting mode in the operation S20, the controller 36 first controls the driving of the scanning unit 20 to scan the white panel 26 in operation S31, and extracts a quantity of light of the white value in operation S32. As shown in FIG. 7, the light quantity of the white value obtained from the scanned white panel is measured and extracted by the CCD sensor 31 by a predetermined voltage in the available pixels, respectively.

According to the light quantity of the white value, the controller 36 determines a predetermined reference value R. The reference value R is for determining the appropriateness of the light quantity, and is programmable in consideration of the various types of lamps 21 and performance of the amplifier 32.

Next, the determined reference value R is stored in the storage unit 34 in operation S34. Further, the controller 36 calculates an initial average A of light quantity from the light quantity of the extracted white value in operation S35. The initial average value A is obtained with respect to the entire area of the available pixels of the white panel 26. The initial average value A is stored in the storage unit 34 in operation S36.

The controller 36 also divides the extracted white values into pixel divisions n in operation S37. Next, the controller 36 calculates initial divisional average values B1~Bn of the respective divisions of pixels in operation S38. The initial divisional values B1~Bn are stored in the storage unit 34 and set in operation S39. The initial divisional values B1~Bn may be an average value of a plurality of pixels disposed within each of the divisions n corresponding to each portion of the white panel 26.

As described above, when the initial references of the light quantity of the lamp 21, i.e., the reference value R, the initial average (A), and the initial divisional values (B1~Bn) are obtained and stored in the storage unit 34, the initial setting in operation S20 is completed.

With the initial references being set as described above, the devices are shipped and sold. In the home, when the user turns on the system for the first time, the initial references that are set before the shipping are initialized as stored in the storage unit 34.

Accordingly, the comparison/determination of the light quantity is performed in operation S23). The comparison/determination mode of operation S23 will be described below in detail with reference to FIG. 8.

In operation S23, first, the white panel 26 is scanned to re-extract the quantity of light of the lamp 21 and to obtain the respective measured values with which the initial reference values as set are compared. The CCD sensor 31 extracts the quantity of light of the white value of the scanned white panel 26 in operation S42.

The controller 36 calculates an average value a and a minimum value m from the extracted quantity of light of the white value. Then the controller 36 divides the extracted white value into divisions n, and calculates each light quantity of measured divisional values b1~bn for the respective pixels of the divisions n in operation S43). The calculated measured values, i.e., the average value a, the minimum value m and the measured divisional values b1~bn are stored in the storage unit 34, respectively in operation S44. The measured divisional values b1~bn may be a measured average value of a plurality of pixels of divisions n corresponding to the white panel 26.

Next, the controller 36 compares the average value A initially set and stored in the storage unit 34 with the extracted average value a in operation S45. Then the controller 36 determines whether the initial and measured average values A, a are different from each other by more than 10% in operation S46.

When it is determined that the light quantities of the initial and measured average values are different from each other by more than 10%, the controller 36 performs a first checking in operation S50 in which the controller 36 checks if there is abnormality in the lamp 21. In the first checking operation S50, the controller 36 first searches the divisions to determine to which of the divisions the minimum value m falls in operation S47. Then it is determined whether the minimum value m of the light quantity is in the first division or in the nth division in operation S48. The first and nth divisions correspond to respective opposite end sides of the white panel 26.

Here, as shown in FIG. 7, when the minimum value m of the measured light quantity L2 is in the first or in the nth division, the minimum value m is compared with the reference value R of the light quantity L1 as set in operation S49.

Next, the controller 36 determines whether the minimum value m is less than the reference R in operation S51. In operation S51, when the minimum value m is less than the reference R as shown in FIG. 7, the controller determines that the quantity of light of the lamp 21 is not enough, and displays a message urging a lamp replacement in the display device 38 in operation S52. That is, when the minimum value m is smaller than the reference value R, the light quantity from both ends of the lamp 21 are insufficient, which is because of blackening. When using the lamp 21 in such a condition, there are considerable distortions in the images. Accordingly, noticing the message for lamp exchange in the display 38, the user replaces the lamp 21 with a new one by himself/herself or has the repairman do the replacement.

Meanwhile, when the difference between the initial and measured averages A, a compared in operation S46 is smaller than 10%, a second checking in operation S56 is performed. In operation S56, it is checked whether there is a contaminant in the optical path that includes a white panel 26 and mirrors 22 and 25a.

Figure 9:
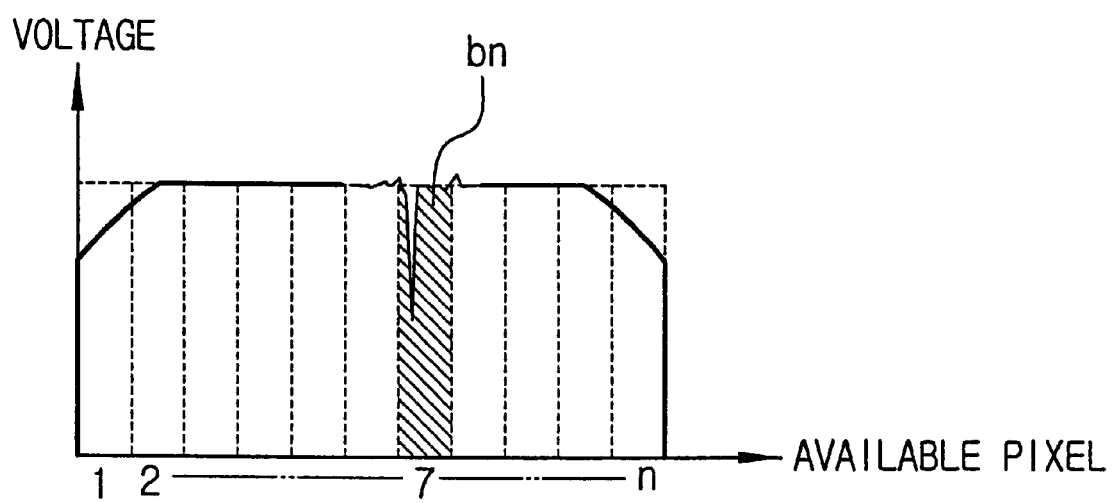
FIG. 9 is a graph showing the quantity of the light measured when there is contamination in an optical path of the image scanning device of FIG. 5.

In operation S56, first, the initially set averages of the respective initial divisional values B1~Bn are compared with the measured averages of the respective measured divisional values b1~bn, respectively in operation S53. Then it is determined whether there is any division where the difference between the initial divisional values B1~Bn and newly measured divisional values b1~bn is more than a predetermined reference, i.e., more than 10% for example in operation S54. In operation S54, when the difference of the initial and measured divisional values B1~Bn, b1~bn is more than 10% in the seventh division, for example (see FIG. 9), the controller 36 drives the display 38 to indicate a warning message about the contaminations in the optical path in operation S55. That is, as shown in FIG. 9, when the more than 10% of difference is found in the seventh division instead of the first or the nth division, it is assumed that a certain location of the white panel 26 that corresponds to the seventh division, or the mirrors 22 and 25a are contaminated. Accordingly, the warning message, like "WHITE PANEL, MIRROR CONTAMINATION!!" is displayed. Noticing the warning message, the user can check and clean or have the repairman clean the contaminated area.

Meanwhile, when there is no division where the difference if more than 10%, since it is assumed that the optical path inclusive of the lamp 21 is in a normal condition, the controller 36 performs the next step, i.e., the controller 36 maintains the standby mode and waits for a key input.

Further, in operation S48, even when it is determined that the minimum value m does not fall neither to the first division nor to the nth division, the second checking in operation S56 can still be performed to check the contamination of the optical path.

Further, after displaying the message urging the lamp replacement in operation S52, the presence of contaminants in the optical path can still be checked by performing the second checking operation S56). This is in consideration of the possibility that the lamp replacement time would coincide with the contamination of the optical path. Accordingly, by checking the need for lamp replacement together with the presence of contaminants in the optical path at one time, the user can be prepared for the possible errors of various kinds appropriately.

As described above, with the method of detecting an error in an image scanning device according to the present invention, it is determined whether to check a need for lamp replacement or a presence of contaminants in an optical path by comparing initially set reference values with newly measured values.

Accordingly, unlike the conventional way, the checking of the need for lamp replacement and the checking of the presence of contaminants in the optical path, can either be distinguishably and selectively performed, or simultaneously performed, so that the accurate error detecting and indicating is guaranteed.

Further, since the user appropriately deals with the error according to the indicated error message, replacing the lamp or cleaning the contaminated area, there is no possibility that the user replaces the lamp, which is still good, and accordingly, the costs can be reduced. Also, the user can maintain the machine with more convenience.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of detecting an error in an image scanning device that obtains image data upon scanning a document by using a light beam radiated from a lamp, the method comprising:

in a setting operation, obtaining initial reference values of a light quantity of the lamp and storing the obtained initial reference values in a memory;

in a storing operation, measuring the light quantity of the lamp during use of the image scanning device, obtaining measured values for comparing with the initial reference values, and storing the measured values in the memory; and in a comparing/determining operation, determining whether to check a presence of error in the lamp or to check a presence of contaminant in an optical path by comparing the initial reference values with the measured values.

2. The method of claim 1, wherein the setting operation comprises:

extracting a quantity of light of a white value by scanning a white panel;

calculating a predetermined reference value and an initial average value from the extracted light quantity of the white value;

storing the calculated reference value and the initial average value in the memory;

dividing the white value into a plurality of pixel divisions; and calculating initial divisional values of the light quantity of the respective pixel divisions and storing the calculated initial divisional values in the memory.

3. The method of claim 2, wherein the storing operation comprises:

extracting a light quantity of a white value by scanning a white panel;

obtaining a measured average value and a minimum value of the light quantity from the extracted light quantity of the white value;

storing the obtained measured average value and the measured minimum value in the memory;

dividing the white value into a plurality of pixel divisions; and calculating measured divisional values of the light quantity of the respective of pixel divisions and storing the calculated measured divisional values in the memory.

4. The method of claim 3, wherein the comparing/determining operation comprises a first checking operation of checking a presence of abnormality of the lamp when a difference between the initial reference values and the measured average and minimum values is more than a predetermined reference value.

5. The method of claim 4, wherein the first checking operation comprises:

searching a pixel division corresponding to the minimum value from the pixel divisions;

determining whether the pixel division having the minimum value is a first division or an nth division;

comparing and thus determining whether the minimum value is smaller than the reference value, when the pixel division having the minimum value is the first or the nth division; and displaying a message for a lamp replacement when the minimum value is smaller than the reference value.

6. The method of claim 4, further comprising a second checking operation of checking the presence of contaminants in the optical path when the pixel division having the minimum value is not the first nor the nth division, or when the minimum value is smaller than the reference value.

7. The method of claim 4, further comprising a second checking operation of checking the presence of contaminants in the optical path after a message for a lamp replacement is displayed.

8. The method of claim 6, wherein the second checking operation comprises:

comparing the initial divisional values of the light quantity of the respective pixel divisions with the corresponding measured divisional values of the light quantity of the respective pixel divisions, respectively;

determining whether there is a pixel division where a difference between the initial average values and the extracted average values is greater than a predetermined reference; and displaying a message indicating a contamination of the optical path when a difference between the initial divisional values and the corresponding measured divisional values is greater than the predetermined reference value.

9. The method of claim 3, further comprising a second checking operation of checking the presence of contaminants in the optical path of the lamp when the difference between the initial reference values and the measured values is smaller than a predetermined reference value in the comparing/determining operation.

10. The error detecting method of claim 9, wherein the second checking operation comprises:

comparing the initial average values of the light quantity of the respective pixel divisions with the extracted average values of the light quantity of the respective pixel divisions;

determining from the result of the comparing/determining step as to whether there is a pixel division where the difference is greater than the predetermined reference; and displaying a message indicating the contamination of the optical path when there is the pixel division where the difference is greater than the predetermined reference.

11. A method in an image scanning device, comprising:

emitting a light beam from a light source along an optical path;

generating a data signal from the light beam, the light beam being received by a single sensor portion; and generating one of a first indication of the replacement of the light source and a second indication of the existence of a contaminant in the optical path in response to the data signal.

12. The method of claim 11, further comprising receiving the light beam reflected from a white panel and generating the data signal in response to the reflected beam.

13. The method of claim 11, further comprising making a comparison of whether the data signal is less than a reference value.

14. The method of claim 13, wherein one of the first indication and the second indication is generated in response to the comparison.

15. A method in an image scanning device, comprising:

emitting a light beam from a light source along an optical path;

receiving the light beam reflected from a reference panel and generating a data signal from the received light beam;

generating one of a first indication of the replacement of the light source and a second indication of the existence of a contaminant in the optical path in response to the data signal;

generating a plurality of divisional signals in response to the data signal, the divisional signals corresponding to respective divisional portions of the reference panel; and making a comparison of whether one of the divisional signals is less than a reference value, wherein one of the first indication and the second indication is generated in response to the comparison.

16. The method of claim 15, wherein the first indication is generated when the one of the divisional signals corresponding to a peripheral divisional portion of the reference panel is less than the reference value.

17. The method of claim 15, wherein the second indication is generated when the one of the divisional signals corresponding to one of divisional portions of the reference panel other than a peripheral divisional portion of the reference panel is less than the reference value.

18. A method in an image scanning device, comprising:

generating a plurality of divisional data signals corresponding to respective divisions of a reference panel; and generating an indication signal indicating one of the replacement of a lamp and the existence of a contaminant in an optical path when one of the divisional data signals is less than a reference value.

19. The method of claim 18, further comprising:

generating an average data signal of the divisional data signals; and generating the indication signal indicating the lamp replacement when the average data signal is less than an average reference value.

20. The method of claim 18, further comprising:

generating a minimum data signal which is indicative of a minimum value among the divisional data signals, wherein the indication signal represents the existence of the contaminant disposed in the optical path when one of the divisions corresponding to the minimum data signal is disposed in a peripheral portion of the reference panel and when the minimum data signal is less than the reference value.

21. The method of claim 20, wherein the indication signal represents a lamp replacement when the one of the divisions is not disposed in the side of the reference.

22. A method of an image scanning device having a reference panel having a plurality of divisions, comprising:

scanning a reference panel using a first light beam emitted from a light source along an optical path toward the reference panel;

generating a reference value in response to the first light beam reflected from the reference panel;

scanning the reference panel using a second light beam emitted from the light source along the optical path toward the reference panel;

generating a plurality of divisional data signals corresponding to the respective divisions of the reference panel in response to the second light beam reflected from the reference panel;

making a determination of whether one of the divisional data signals is less than the reference value; and generating one of a first indication signal indicating that the light source is replaced and a second signal indicating that the optical path contains a contaminant in response to the determination.

23. The method of claim 22, wherein the first indication is generated when one of the divisions corresponding to the one of the divisional data signals is disposed on a peripheral portion of the reference panel.

24. The method of claim 22, wherein the second indication is generated when the one of the divisional signals corresponding to one of divisional portions of the reference panel other than a side division of the reference panel is less than the reference value.

25. A method in an image scanning device, comprising:

scanning a reference panel having a plurality of divisions using a light beam emitted from a light source along an optical path toward the reference panel;

generating a plurality of divisional data signals corresponding to the respective divisions of the reference panel in response to the light beam reflected from the reference panel;

making a determination of whether one of the divisional data signals is less than a reference value; and generating, in response to the determination, an indication signal that represents the replacement of the light source or the existence of a contaminant disposed in the optical path in response to the determination.

26. A method in an image scanning device, comprising:

storing a reference value representing light intensity of a reference panel;

scanning the reference panel using light of a light source;

extracting the light intensity from the light reflected from the reference panel along an optical path;

generating a plurality of divisional signals representing respective divisions of the reference panel from the light intensity;

generating an average value and a minimum value from the divisional signals; and generating an indication signal indicating one of the replacement of the lamp and the existence of a contaminant in the optical path in response to at least one of the reference value, the divisional signals, the average value, and the minimum value.

27. The method of claim 26, further comprising:

generating the indication signal indicating of the replacement of the lamp when the one of the divisions of the panel corresponding to the minimum value is not disposed in a peripheral portion of the reference panel but an inside portion of the reference panel other than the peripheral portion of the reference panel.

28. The method of claim 26, further comprising:

comparing the average value with the reference value of the reference panel; and generating the indication signal indicating of the replacement of the lamp when the average value is less than the reference value.

29. The method of claim 26, further comprising:

comparing the minimum value with the reference value; and generating the indication signal when the minimum value is less than the reference value.

30. The method of claim 26, further comprising:

determining which one of the divisions corresponds to the minimum value; and generating the indication signal when the one of the divisions of the reference panel corresponding to the minimum value is disposed in a peripheral portion of the reference panel.

31. The method of claim 26, further comprising:

determining which one of the divisions corresponds to the minimum value; and generating the indication signal indicating the existence of the contaminant in the optical path when the one of the divisions of the reference panel corresponding to the minimum value is not disposed in an inside portion of the reference panel but in a peripheral portion of the reference panel other than the inside portion of the reference panel.

32. The method of claim 26, wherein the reference panel is a white panel.

33. The method of claim 26, wherein the reference panel is scanned a predetermined period of time after the reference value is stored.

34. The method of claim 26, wherein the reference panel is scanned when a predetermined number of scanning operations are performed.

35. The method of claim 26, wherein the reference panel is scanned when a predetermined period of time passes after any key signal is not received to perform a scanning operation of scanning a document.

36. The method of claim 26, wherein the reference panel is scanned when the device is turned on.

37. The method of claim 26, wherein the reference panel comprises a plurality of pixels which are divided by the number of the divisions.

38. The method of claim 26, wherein the divisions comprise a plurality of pixels, wherein an average of light intensity of the pixels represents one of the divisional signals.

39. The method of claim 26, wherein the reference value is stored when the device is manufactured.

40. The method of claim 26, wherein the reference value is replaced with a second reference value when the lamp is replaced, when the device is repaired, or when the contaminant disposed in the optical path is removed.

41. The method of claim 26, wherein the reference value is stored when the lamp is replaced, when the device is repaired, or when the contaminant disposed in the optical path is removed.

42. The method of claim 26, further comprising:

storing a plurality of divisional reference values representing respective reference divisions of the reference panel; and generating the indication signal when one of the divisional signals is less than corresponding one of the divisional reference values by a predetermined amount.

43. The method of claim 42, further comprising:

generating the indication signal when a division of the divisions having the one of the divisional signals is disposed on a peripheral side of the reference panel.

44. The method of claim 43, wherein the indication signal represents that the lamp used in the image scanning device should be replaced.

45. The method of claim 44, further comprising:

generating the indication signal when the division of the divisions having the one of the divisional signals is not disposed on one of opposite peripheral sides of the reference panel but disposed between the opposite peripheral sides of the panel.

46. The method of claim 45, wherein the indication signal represents that a component disposed in the image scanning device should be replaced or repaired.

47. An apparatus in an image scanning device, comprising:

a memory storing an average reference value;

a reference panel having a plurality of divisions;

a lamp emitting a light beam toward the reference panel along an optical path;

a detector receiving the light beam reflected from the reference panel and generating a detection signal;

a controller generating an average signal and a plurality of divisional signals corresponding to respective divisions of the reference panel in response to the detection signal, and generating an indication signal when one of the divisional signals is less than the reference average by a predetermined value.

48. The apparatus of claim 47, wherein the memory stores a plurality of divisional reference values corresponding to respective divisions of the reference panel, the controller generating the indication signal when one of the divisional signals is less than corresponding one of the divisional reference values.

49. The apparatus of claim 48, wherein the controller generates the indication signal when the one of the divisional signals is less than the average reference value.

50. The apparatus of claim 48, further comprising generating a minimum value from the divisional signals and generating the indication signal when one of the divisions having the minimum value is disposed in one of sides of the reference panel.

51. The apparatus of claim 50, wherein the indication signal represents that the lamp should be replaced.

52. The apparatus of claim 48, further comprising generating a minimum value from the divisional signals and generating the indication signal when one of the divisions having the minimum value is not disposed in one of sides of the reference panel but disposed between the sides of the reference panel.

53. The apparatus of claim 52, wherein the indication signal represents that a contaminant is disposed in the optical path.

* * * * *